United States Patent [19]
Roy

[11] Patent Number: 5,922,942
[45] Date of Patent: Jul. 13, 1999

[54] LEAK NOISE CORRELATOR APPARATUS

[75] Inventor: Keith John Roy, Newport, United Kingdom

[73] Assignee: Palmer Environmental Limited, Gwent, United Kingdom

[21] Appl. No.: 08/935,315

[22] Filed: Sep. 22, 1997

[51] Int. Cl.$^6$ .............................. G01M 3/00; G01N 29/00
[52] U.S. Cl. .......................................... 73/40.5 A; 73/592
[58] Field of Search ........................... 73/40.5 R, 40.5 A, 73/592

[56] References Cited

U.S. PATENT DOCUMENTS

| | | | |
|---|---|---|---|
| 4,083,229 | 4/1978 | Anway | 73/40.5 |
| 4,289,019 | 9/1981 | Claytor | 73/40.5 A |
| 4,640,121 | 2/1987 | Leuker et al. | 73/40.5 A |
| 4,858,462 | 8/1989 | Coulter et al. | 73/40.5 A |
| 5,205,173 | 4/1993 | Allen | 73/592 |
| 5,416,724 | 5/1995 | Savic | 364/509 |
| 5,531,099 | 7/1996 | Russo | 73/40.5 A |
| 5,548,530 | 8/1996 | Baumoel | 364/509 |

FOREIGN PATENT DOCUMENTS

| | | |
|---|---|---|
| 0 711 986 A2 | 11/1995 | European Pat. Off. . |
| 8-268227 | 10/1996 | Japan . |

Primary Examiner—Michael Brock
Attorney, Agent, or Firm—David P. Gordon; David S. Jacobson; Thomas A. Gallagher

[57] ABSTRACT

A leak noise correlator apparatus comprises first and second data logging units having acoustic transducers connected to them for application to a fluid-carrying pipe either side of a suspected leak. One data logging unit is arranged to communicate an initialising signal to the other unit to synchronise the substantially simultaneous acquisition of signals by the two units. This initialising signal is communicated by an infra-red link when the two units are brought together prior to installation at their respective sites on the pipe. Subsequent cross-correlation of the acquired data records determines the location of the leak.

8 Claims, 2 Drawing Sheets

LEAK NOISE CORRELATOR APPARATUS

BACKGROUND OF THE INVENTION

1. Field of the Invention

The present invention relates to a leak noise correlator apparatus for determining the location of a leak in a fluid-carrying conduit, particularly in an underground water pipe.

2. State of the Art

It has been known for a long time that water or other fluid escaping from a pressurised pipe generates a characteristic noise at the location of the leak. This characteristic noise is propagated along the pipe in both directions from the leak location and with equal velocity. It has also long been known to determine the leak location quite precisely by coupling acoustic transducers to the pipe on either side of the leak: the leak noise is received by both transducers but with a time difference which depends on the distances of the transducers from the leak location; the location of the leak can accordingly be determined as a function of this time difference. U.S. Pat. No. 4,083,229 (Anway) discloses an apparatus which receives electrical signals from the two transducers and performs a cross-correlation of these two signals to determine the time difference between the characteristic leak noise in these two signals and accordingly determine the location of the leak.

Hitherto, leak noise correlator apparatus have employed a pair of acoustic transducers either connected to it by means of cables or transmitting their output to it as radio-frequency signals. However, practical difficulties arise in connecting the transducers to the apparatus using cables, because the transducers are often coupled to the pipe at considerable distances apart and it may be physically difficult to run the necessary cables, especially in busy city centres. For radio transmission, the apparatus is limited by the quality and cost of the radio communication equipment required: also, under certain jurisdictions, the maximum output power may be severely limited; also, the licensing of radio frequency equipment may be limited.

SUMMARY OF THE INVENTION

We have now devised a leak noise correlator apparatus which overcomes the above-mentioned limitations.

In accordance with the present invention, there is provided a leak noise correlator apparatus which comprises first and second data logging units having respective acoustic transducers connected to them, each data logging unit being arranged to record electrical signals from its acoustic transducer to provide a data record and one said unit including means to communicate an initialising signal to the other said unit to synchronise the substantially simultaneous acquisition of signals by the two said units, the apparatus further comprising means to cross-correlate the data records acquired by the respective said units, Preferably the two data logging units are brought together and the initialising signal is communicated from one unit to the other prior to the two units being separated and installed at their respective data-logging sites. Preferably the initialisation signal is transmitted via an infra-red (IR) link.

The initialisation signal operates on both units to commence a count-down, at the end of which the two units start to record the signals from their acoustic transducers. The count-down gives sufficient time for the two units to be separated and taken to the sites at which their transducers are to be coupled to the pipe.

After the data recording period, typically 60 seconds, the two data logging units are brought back together and the data recorded in the two units is cross-correlated, in accordance with known principles, to determine the location of the leak in the pipe.

The system oscillators of the two data logging units may tend to differ or drift in frequency, as a result of which one unit may time-out and commence its data acquisition cycle slightly prior to the other. The result is that the recording period of the one unit may commence slightly before the recording period of the other unit, and then terminate slightly before the recording period of the other unit.

Preferably the apparatus is arranged to compare the frequencies of the two system oscillators and determine the difference. This may be used to determine the time delay between the recording periods of the two data logging units, then apply a time-correction to the set of data of one unit before the cross-correlation is performed.

The frequency-difference signal may instead by used, prior to the measurement cycle, to adjust the frequency of the oscillator of one of the data logging units, to bring it substantially into agreement with the frequency of the oscillator of the other unit.

In an alternative embodiment, each data logging unit includes a radio receiver which can be tuned to any convenient broadcast radio channel. Each unit further comprises a memory into which samples of the received radio channel are stored. When the two units are subsequently brought together, a cross-correlation of the acquired radio signals is performed, in order to determine any difference in time between the acquisition period of the two units. This time-difference is applied to the data record acquired by one of the units, in order to correct for the time difference: the corrected data record is then cross-correlated with the data record acquired by the other data logging unit, in order to determine the leak location.

Embodiments of the present invention will now be described by way of examples only and with reference to the accompanying drawings.

DETAILED DESCRIPTION OF THE PREFERRED EMBODIMENT

Figure 1:
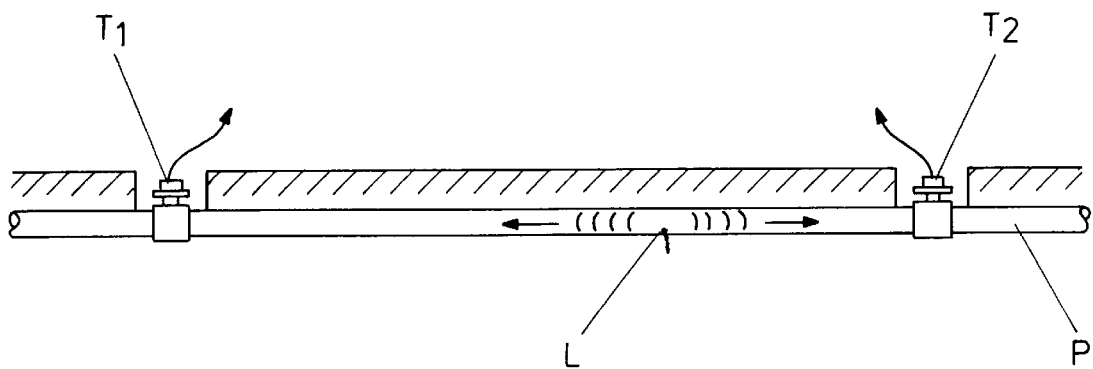
FIG. 1 is a schematic diagram to explain the principles of detecting a leak in a pipe using leak noise correlation.

Referring to FIG. 1 of the drawings, in order to locate the position of a leak L on a pipe P, acoustic transducers T1 and T2 are coupled to the pipe P either side of the suspected location of the leak. Typically, the transducers are coupled on pipe fittings which are conveniently accessible. The signals from the two transducers must be communicated to an apparatus which is able to cross-correlate this signal in order to determine the leak location.

Figure 2:
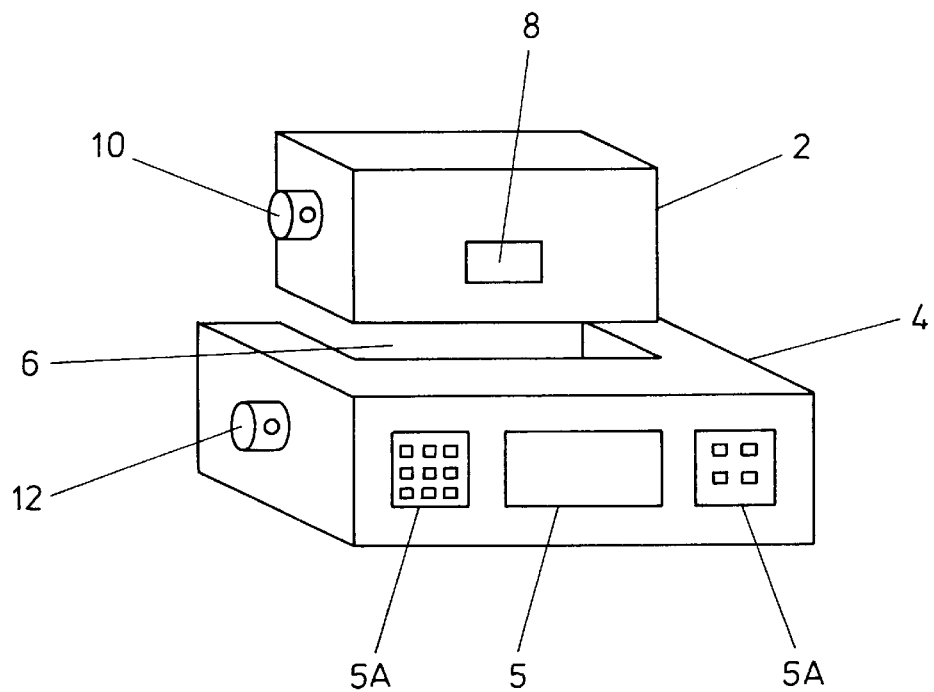
FIG. 2 is a view of a leak noise correlator apparatus in accordance with the present invention.

Referring to FIG. 2 of the drawings, a leak noise correlator apparatus in accordance with the present invention comprises a main data logging unit 4 and an auxiliary data logging unit 2. The main unit includes a correlator system and additionally includes a visual display 5 and a number of operating keys 5a. The units 2,4 have connectors 10,12 for the connection of their respective acoustic transducers via short cables. The two units are arranged to be brought together, the unit 2 locating within a recess G formed in the unit 4, so that communication can take place between the two units via an infra-red (IR) link, the IR transmitter/receiver device of unit 2 being shown at 8.

Prior to testing the pipe for a leak, the two units 2,4 are brought together. Then upon actuating one of the keys 5a on the main unit 4, the unit 4 generates an initialisation signal to initialise timing clocks of both units: this signal acts directly on the timing clock of the main unit 4 and is transmitted via the infra red link to the auxiliary unit 2, where it correspondingly initialises the timing clock of the auxiliary unit.

The timing clocks of the two data logging units now start counting down: once each clock times out, it commands the data recording system of that unit to start recording the electrical signals provided by its acoustic transducer. In particular, this acoustic signal is periodically sampled, being applied to an analog-to-digital converter and its digital value stored in an electronic memory of the unit. This recording continues over a predetermined period of time, typically 60 seconds.

Upon completion of the recording period, the two units are brought back together. The user actuates an appropriate key 5a to communicate a signal to the auxiliary unit 2, via the infra red link, commanding the auxiliary unit to transmit its recorded data to the main unit 4. The main unit now performs a cross-correlation of the two sets of data, in order to determine the leak location.

The time delay before recording starts, following the initialisation signal, and the time period over which recording continues, are both selected by the operator using the actuating keys 5a, when the two units are initially coupled together. This information is registered directly in the main unit 4 and is transmitted over the infra red link 8 to the auxiliary unit 2, for registration in that unit.

The time delay from the initialisation signal to the start of recording is sufficient to allow the two data logging units to be separated and then taken to the sites at which their acoustic transducer are coupled to the pipe. Depending on the physical location of the pipe and the points at which the transducer are to be coupled to them, it will be necessary to provide a delay time of several minutes. If the oscillators driving the clocks of the two units are not running precisely at the same frequency, then one unit may time out significantly prior to the other: the effect of this is that the recording period of one unit will not correspond precisely with the recording period of the other unit.

Preferably therefore, the main unit is arranged to measure the difference in frequency between the system oscillators of the two data logging units. The measured difference in frequency is then used to determine the time delay between the recording period of one data logging unit and the corresponding recording period of the other data logging unit: the main unit 4 then effects a time-displacement of one data record relative to the other prior to the cross-correlation process. The frequencies of the two oscillators may be compared either when the two units are brought together for initialisation, or when the two units are brought together after the measurement cycle, or both.

Figure 3:
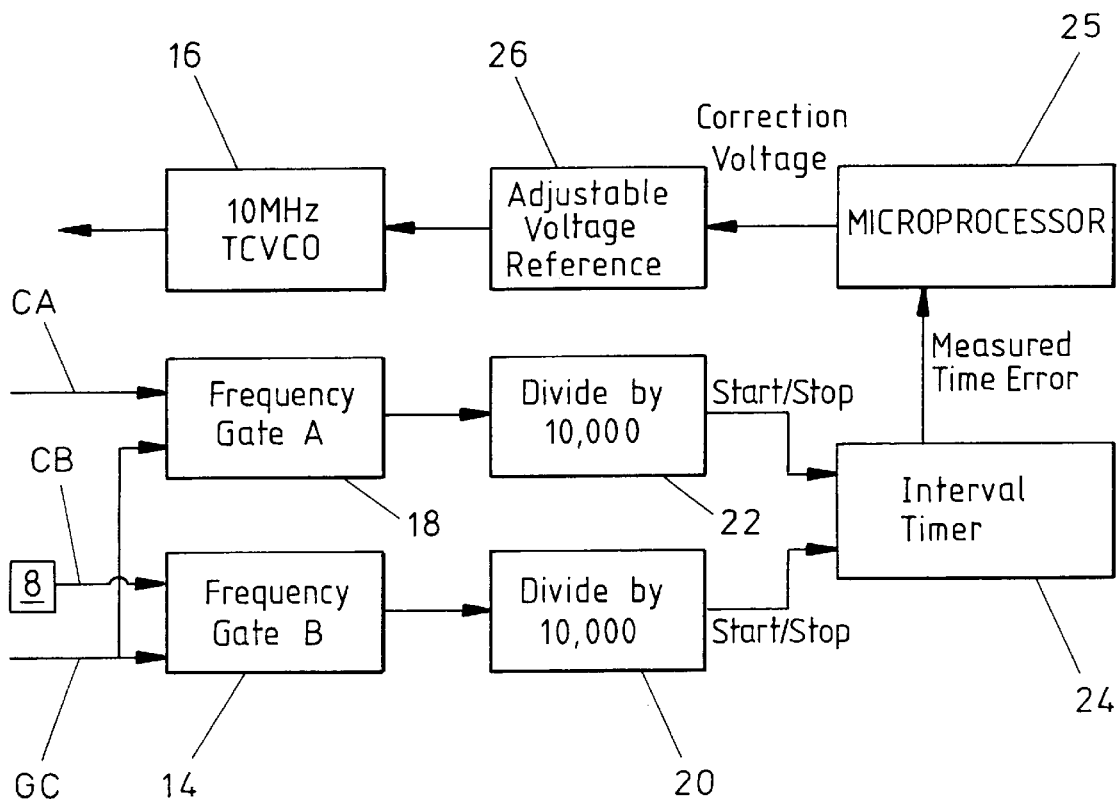
FIG. 3 is a block diagram of an arrangement for comparing the frequencies of the system oscillators of the two data logging units of the apparatus.

FIG. 3 shows diagrammatically one arrangement for comparing the frequencies of the system oscillators of the two data logging units. These oscillators run at a rated frequency of 10 MHZ but their outputs are divided down to provide 10 KHz clock signals. The clock signal CB from the auxiliary unit 2 is transmitted to the main unit 4 over the infra red link and applied to a frequency gate 14: the clock signal CA from the main unit 4 is applied to a frequency gate 18; these gates are controlled by a gate control signal GC provided by the clock signal from the main unit. Frequency dividers 20,22 reduce the frequencies of the gated signals by a factor of 10,000 to provide output signals of one cycle per second: a counter/timer 24 measures the time difference between the leading edges of the respective signals which it receives from the dividers 20,22; this measured time difference is a measure of the difference in frequency between the system oscillators of the two data logging units.

In some circumstances, it may be desirable to adjust the operating frequency of the system oscillator of one unit, to bring it into precise agreement with the system oscillator of the other unit. This is carried out in the initialisation phase: the time difference measured by the counter/timer 24 is passed to a microprocessor 25 which calculates a control voltage which a voltage source 26 must apply to the voltage controlled oscillator (shown at 16) of the main data logging unit.

Figure 4:
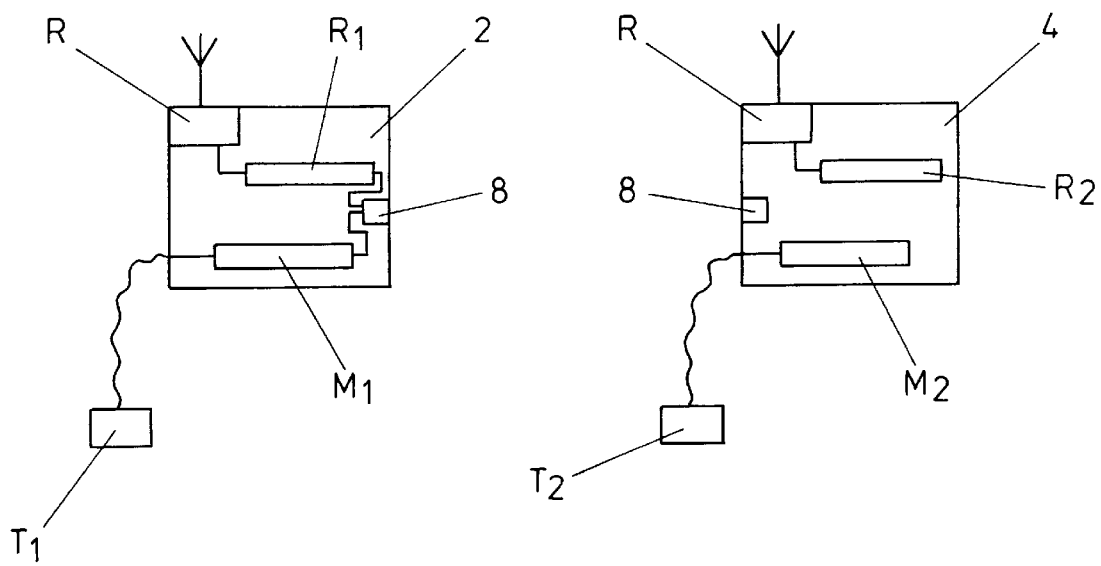
FIG. 4 is a schematic block diagram of alternative embodiment of apparatus in accordance with the invention.

Referring to FIG. 4, in an alternative embodiment, each data logging unit includes a radio receiver R which can be tuned to receive any convenient commercial radio channel. In use, during the recording period whilst the signal samples from the acoustic transducers T1,T2 are being recorded in the respective data memories M1,M2 of the data logging units, samples from the received radio channel are stored in respective memories R1,R2, After the recording process, the two data logging units are brought back together as previously described, for transfer of the recorded data from the auxiliary unit 2 to the main unit 4. Firstly, the correlator system of the main unit 4 performs a cross-correlation on the radio channel data recorded in the respective units, to determine the time delay between the recording period of one unit and the recording period of the other unit. This time delay is then used to effect a time-displacement of the data record of one unit relative to the data record of the other unit (e.g. of the data in memory M1 relative to the data in memory M2), before these two data records arc cross-correlated to determine the location of the leak in the pipe, Although in the embodiments which have been described the cross-correlation procedures are performed in one of the data logging units, instead a separate unit may be provided to receive the acquired data records and perform the cross-correlation.

I claim:

1. A leak noise correlator apparatus which comprises first and second data logging units having respective acoustic transducers connected to them, each data logging unit being arranged to record electrical signals from its acoustic transducer to provide a data record, and one said unit including means to communicate an initialising signal to the other said unit to synchronise the substantially simultaneous acquisition of signals by the two said units, the apparatus further comprising means to cross-correlate the data records acquired by the respective said unit.

2. A leak noise correlator apparatus as claimed in claim 1, arranged for said first and second data logging units to be brought together for said initialisation signal to be communicated prior to said units being separated and installed at their respective data logging sites.

3. A leak noise correlator apparatus as claimed in claim 2, comprising an infra-red link for transmitting said initialising signal from one said unit to the other.

4. A leak noise correlator apparatus as claimed in claim 1, including means for comparing clock frequencies of said data logging units to determine any frequency difference.

5. A leak noise correlator apparatus as claimed in claim 4, arranged to effect a time-displacement correction of the data record acquired by one said unit relative to the data record acquired by the other said unit, in accordance with said frequency difference.

6. A leak noise correlator apparatus as claimed in claim 4, including means responsive to said frequency difference for adjusting the clock frequency of one said unit to agree with the clock frequency of the other said unit.

7. A leak noise correlator apparatus as claimed in claim 1, in which one of said data logging units includes said means for cross-correlating the data records acquired by the respective said units.

8. A leak noise correlator apparatus as claimed in claim 1, comprising a separate unit which includes said means for cross-correlating the data records acquired by the respective said units.

\* \* \* \* \*